Patented Sept. 7, 1948

2,448,890

UNITED STATES PATENT OFFICE 2,448,890

CONDENSATION PRODUCTS OF POLYHYDROXY ALKYLAMINES WITH ALDEHYDES

William B. Johnston, Stamford, Conn., assignor to American Cyanamid Company, New York, N. Y., a corporation of Maine No Drawing. Application October 4, 1941, Serial No. 413,652

8 Claims. (Cl. 260—307)

This invention relates to new organic compounds and their preparation, particularly those such as are obtained by the condensation of aldehydes with polyhydroxy alkylamines.

I have discovered that polyhydroxy alkylamines may be reacted with aldehydes, preferably formaldehyde, to produce a new class of organic compounds. The polyhydroxy alkylamines which I employ include those such as 2-amino-1,3-propane-diol, 2-amino-2-methyl-1,3-propane-diol, 2-amino-2-methylol-1,3-propanediol [tris(hydroxymethyl)amino methane], 2-amino-2-ethyl-1,3-propane-diol, 2-amino-2-ethylol-1,3-propane-diol, 2-amino-2-isopropyl-1,3-propane-diol, etc., which have the general formula

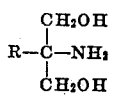

in which R is a member of the group consisting of H, alkyl and alkylol radicals. These compounds may be prepared in known manner by the action of aliphatic aldehydes on primary aliphatic nitroparaffins followed by the catalytic reduction of the nitrohydroxy compounds to the corresponding polyhydroxy alkylamine. Although I prefer to use formaldehyde in my process other aldehydes such as acetaldehyde, heptaldehyde, propionaldehyde, benzaldehyde, etc., may be employed.

The reaction whereby the compounds of the present invention are produced may be brought about in most cases simply by mixing the polyhydroxy alkylamines with formalin. If it is slow it may be speeded up somewhat by gently warming but in most cases it will be found to proceed easily with the evolution of heat. The reaction may be illustrated by the following general equation:

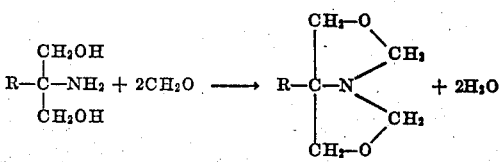

Although experimental evidence leads me to believe that the formula given here represents the most probable structure of my compounds I wish it to be understood that it is given primarily to aid in the understanding of my invention and is not intended to be in limitation thereof.

The product, which may be regarded as a substituted oxazolidine, may be recovered by removing the water in which the formaldehyde was dissolved and the water of reaction by simple evaporation, solvent extraction, or by azeotropic distillation with benzene. It may be further purified by recrystallization from acetone or benzene in the case of the solid compounds or by distillation when the products are liquids.

The new compounds of my invention are useful in the preparation of esters, drying oils, alkyd resins, etc. For example, a drying oil of excellent drying properties may be prepared by reacting my new compounds with unsaturated fatty acids. The reaction may be illustrated by the following equations in which the condensation product of tris (hydroxymethyl) amino methane and formaldehyde is reacted with soya bean fatty acids (RCOOH).

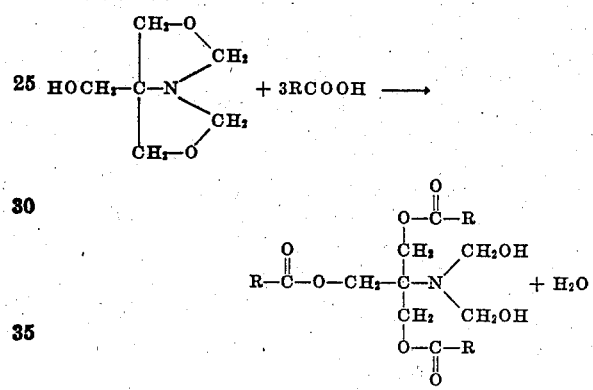

The 

group in the above compound is apparently unstable and undergoes further changes the nature of which is not definitely known but which result in the splitting out of formaldehyde

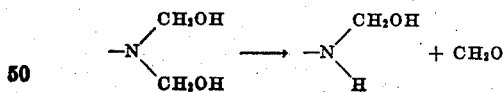

and also the possible elimination of a molecule of H₂O

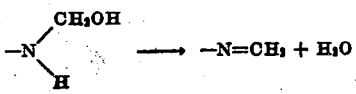

The then resulting compound

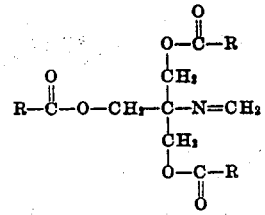

very likely trimerizes to form a closed ring structure. It should be understood, however, that the above equations represent merely a likely course of the reaction of my new compounds with fatty acids and they are given for the purpose of illustrating how my new compounds may be utilized. Regardless of the mechanism of the reaction the reaction product of my compounds with various unsaturated fatty acids and mixtures thereof give drying oils which dry with great rapidity and yield hard films of great water resistance.

My invention will now be described in greater particularity in the following specific examples to which, however, it is not limited. Other condensation products may, of course, be prepared with modifications within the skill of the art.

*Example 1*

121 parts by weight (1 mole) of tris(hydroxymethyl) amino methane was dissolved in 162 parts by weight (2 moles) of aqueous 37% formalin at room temperature. The resulting solution was almost neutral in reaction indicating that most of the amino compound was reacted. Water was then removed by evaporation at room temperature and a crystalline solid obtained which was soluble in acetone and benzene. The product on analysis was found to contain 49.4% carbon, 7.4% hydrogen and 9.1% nitrogen. It had a melting point of 62–63° C. and a hydroxyl value of 372. From these data it appears that the compound has the probable structural formula

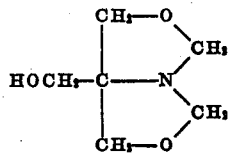

which may be called 3,4-oxydimethyl-4-methylol oxazolidine.

The compound prepared above was reacted with the fatty acids of soya bean oil and linseed oil and the isomerized fatty acids of linseed oil to yield esters having exceptionally good drying qualities.

*Example 2*

25 parts by weight of 2-methyl-2-amino propanediol-1,3 were added to 113 parts by weight of 37% formalin (42 parts CH₂O) with agitation. A slightly exothermic reaction occurred. The mixture was heated on a steam bath until all of the solid amine-alcohol had dissolved. The reaction mixture was then cooled and the product extracted with ethyl ether. The ether fraction was dried with a little Na₂SO₄ and the ether then evaporated to yield a mobile colorless liquid having a boiling point of 178–180° C., freezing point of −5° C. and index of refraction of 25° C. of 1.4556. The product was soluble in water and petroleum ether.

*Example 3*

119 parts by weight of 2-ethyl-2-amino propanediol-1,3 was mixed with 439 parts by weight of 37% formalin (162 parts CH₂O). The heat of the reaction carried the reaction mixture to 60° C. after which it was cooled to room temperature and extracted twice with ethyl ether. The ether extract was dried with Na₂SO₄ and the ether removed by evaporation. The product was then distilled under a vacuum of 1–2 mm. at which it boiled at 75–77° C. to yield a clear mobile liquid having an index of refraction at 25° C. of 1.4582.

The product was made into a drying oil by heating with the fatty acids of linseed oil and gave an oil which air dried rapidly to give a good film resistant to both hot and cold water.

What I claim is:

1. The condensation product of an aldehyde with a polyhydroxy alkylamine of the general formula

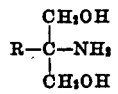

where R is a member of the group consisting of H, alkyl and alkylol radicals said condensation product having the general formula:

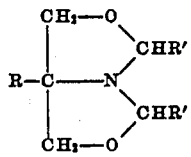

in which R is as defined above and R' is the residue of the aldehyde employed in the reaction.

2. The condensation product of formaldehyde with a polyhydroxy alkylamine of the general formula

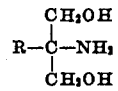

where R is a member of the group consisting of H, alkyl and alkylol radicals said condensation product having the general formula:

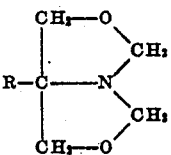

in which R is as defined above.

3. A process of preparing condensation products of the general formula

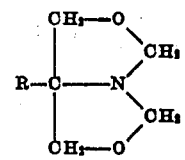

in which R is a member of the group consisting of H, alkyl and alkylol radicals which comprises mixing formaldehyde with polyhydroxy alkylamines of the general formula

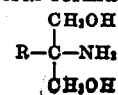

in which R is as above and allowing the mixture to react until the said condensation products have been formed.

4. A process of preparing condensation products of the general formula

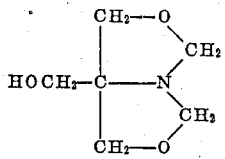

which comprises mixing formaldehyde with polyhydroxy alkyl amines of the general formula

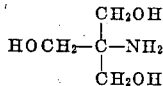

and allowing the mixture to react until the said condensation products have been formed.

5. The condensation product of formaldehyde with a polyhydroxy alkylamine of the general formula

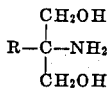

in which R is an alkylol radical, said condensation product having the general formula

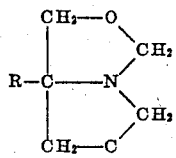

in which R is as defined above.

6. The condensation product of formaldehyde with a polyhydroxy alkylamine of the general formula

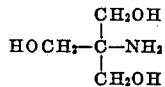

said condensation product having the formula

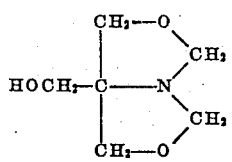

7. The condensation product of formaldehyde with a polyhydroxy alkylamine of the general formula

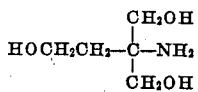

said condensation product having the formula

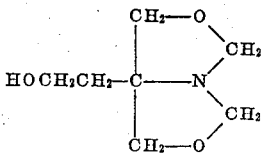

8. The condensation product of formaldehyde with a polyhydroxy alkylamine of the general formula

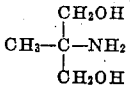

said condensation product having the formula

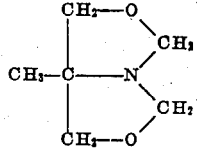

WILLIAM B. JOHNSTON.

REFERENCES CITED

The following references are of record in the file of this patent:

UNITED STATES PATENTS

| Number | Name | Date |
|---|---|---|
| 1,972,465 | Ulrich et al. | Sept. 4, 1934 |
| 2,194,294 | Cass | Mar. 19, 1940 |
| 2,194,314 | Maxwell | Mar. 19, 1940 |
| 2,243,295 | Susie | May 27, 1941 |
| 2,247,106 | Vanderbilt | June 24, 1941 |
| 2,250,408 | De Groote | July 22, 1941 |

FOREIGN PATENTS

| Number | Country | Date |
|---|---|---|
| 564,787 | Germany | Nov. 23, 1932 |
| 566,453 | Germany | Dec. 17, 1932 |

OTHER REFERENCES

Industrial & Engineering Chemistry, Vanderbilt et al., vol. 32 (1940), pages 34 to 38.